United States Patent [19]

Mueller et al.

[11] Patent Number: 5,196,253
[45] Date of Patent: Mar. 23, 1993

[54] SOUND ABSORBING HEAT SHIELD WITH PERFORATE SUPPORT LAYER

[75] Inventors: Peter Mueller, Reinheim, Fed. Rep. of Germany; Ivan Gheczy, Sevelen, Switzerland

[73] Assignee: Matec Holdikng AG, Kusnacht, Switzerland

[21] Appl. No.: 639,433

[22] Filed: Jan. 10, 1991

[30] Foreign Application Priority Data

Jan. 22, 1990 [CH] Switzerland ............................. 188/90

[51] Int. Cl.⁵ ............................................. B32B 3/24
[52] U.S. Cl. ......................... 428/138; 428/74; 428/75; 428/137; 428/263; 428/432; 428/156; 428/920; 428/99; 428/124; 428/174; 428/182; 296/39.3; 181/211; 181/284; 181/290; 181/292
[58] Field of Search ................... 428/74, 75, 138, 137, 428/263, 432, 156, 920, 99, 124, 174, 182; 296/39.3; 181/211, 284, 290, 292

[56] References Cited

U.S. PATENT DOCUMENTS

| | | | |
|---|---|---|---|
| 2,116,771 | 5/1938 | Seaman | 296/39.3 |
| 2,576,698 | 11/1951 | Russum | 428/75 |
| 3,021,915 | 2/1962 | Kemp | 428/74 |
| 4,369,744 | 1/1981 | Kubozuka | 123/198 E |
| 4,609,067 | 9/1986 | Gonwa | 181/211 |

FOREIGN PATENT DOCUMENTS

| | | |
|---|---|---|
| 1180155 | 10/1964 | Fed. Rep. of Germany . |
| 8700919 | 1/1987 | Fed. Rep. of Germany . |
| 8700919.6 | 4/1987 | Fed. Rep. of Germany . |
| 3821468 | 12/1989 | Fed. Rep. of Germany . |
| 2482643 | 11/1981 | France . |
| 0005421 | 2/1980 | Japan ................... 428/75 |

*Primary Examiner*—Ellis P. Robinson
*Assistant Examiner*—William P. Watkins, III
*Attorney, Agent, or Firm*—Griffin Butler Whisenhunt & Kurtossy

[57] ABSTRACT

A heat shield (1) includes a support layer (2) that is perforate only in predetermined partial areas (6, 7, 8) and comprises an insulation layer (3) that has a protective coating (4, 5) on both sides thereof. In particular, flange areas (6), attachment areas (8), and areas of bent or angular deformities (7) are free of perforations. A protective coating (5) on a side of the insulation layer facing the support layer has a thickness of less than 30 μm and can be constructed of a thin aluminum foil or a sprayed or deposited metalized coating. Preferably, the protective coating has fine pores.

10 Claims, 1 Drawing Sheet

SOUND ABSORBING HEAT SHIELD WITH PERFORATE SUPPORT LAYER

BACKGROUND OF THE INVENTION

This invention relates to a sound absorbing heat shield having a perforate support layer on which a sound absorbing heat damming, or insulating, layer is attached, with the insulating layer having a protective coating on both sides thereof.

Such heat shields are used, among other places, in the automobile industry to case, or line, for example, interiors of tunnels or pipings of floor portions of motor vehicles. Such a casing is very important today because temperatures of exhausts, and thereby also temperatures of exhaust pipes, are substantially increased today with normal use of catalytic converters; and, on the other side, threshold values of motor-vehicle noise levels are continually set lower. For example, it is anticipated that standards in the European community for 1991 will be reduced to about half of normal noise levels today for commercial vehicles.

Previously-known heat shields have been predominantly of thick sheet metal parts with high heat reflection capabilities, preferably of aluminum, with heat absorbing insulation layers having protective foil thereon. The thusly used insulation layers are normally respectively of ceramic-, stone-, or glass-wool foams. These heat shields, however, are not particularly acoustically effective because sound waves will be, to a large extent, reflected. Such a heat shield is, for example, described in DE-U-8700919.6.

It has therefore also already been suggested that instead of using a relatively thick sheet metal part, one should use a metallic mesh or an expanded metal and to coat both sides of an insulation layer thereof with a protective foil. Such heat shields indeed display improved sound absorbing characteristics, however, they have not found particular success in the practice. For one thing, a metallic braid or mesh, or an expanded metal creates sawtooth like structures at deformed areas and in particular at flange, or peripheral edge, areas or zones which damage the thin protective foils. Also, attachment areas of these heat shields break away easily and must, therefore, be provided with additional mounting attachment elements. Such measures indeed prevent a ripping or breaking away from heat-shield mounting supports; however, because of this increased expenditure, they increase the difficulty and costs of mounting these heat shields. A further substantial disadvantage of such a heat shield is that an outer edge thereof cannot be completely sealed by means of a flange so that insulation material can absorb moisture thereat.

It is therefore an object of this invention to provide a sound absorbing heat shield which does not have these disadvantages of such known apparatus.

In particular, it is object of this invention to provide a stable shield which has distinct heat- and sound-absorbing characteristics which can be manufactured in an uncomplicated manner, allows a reliable mounting or attachment thereof, and which shows substantially no fatigue or sign of wear after relatively long use.

SUMMARY

According to principles of this invention, a heat shield for solving the objects of this invention has a perforated support layer with perforation free partial areas whose contours are predetermined.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF A PREFERRED EMBODIMENT

Figure 1:
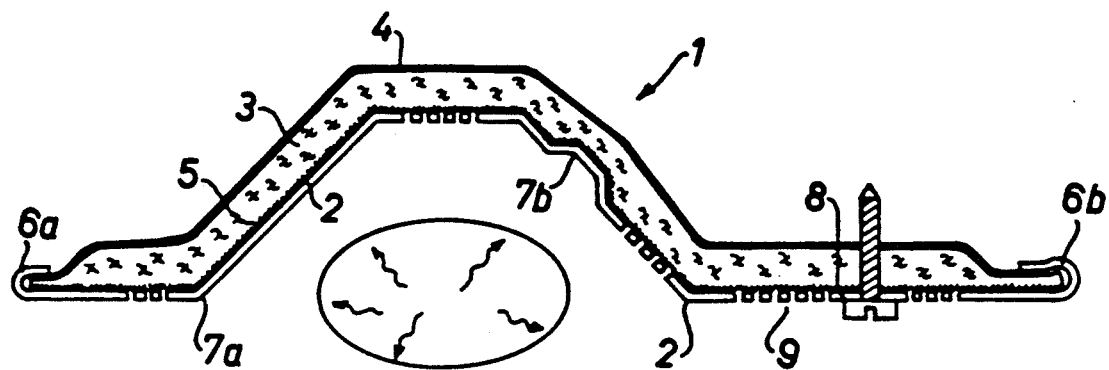
FIG. 1 is a cross section through a heat shield of this invention with a heat and/or sound source being shown schematically thereon.

A heat shield 1 shown in FIG. 1 comprises essentially a perforate support layer 2 having good reflection properties for heat radiation and preferably also good heat conducting properties and a sound-absorbing/heat-damming, or insulating, layer 3 of a mineral or ceramic material of natural or inorganic fibers, or of a mixture of these substances with Teflon or other off-the-shelf material, the insulating layer 3 being provided with protective coatings, or coverings, 4 and 5.

Preferably, aluminum sheet metal having a thickness between 0.2 mm and 1.2 mm is used for the support layer 2. The heat insulating layer 3 can, for example, be of a mineral foam, a ceramic fiber non-woven fabric, or mat, or of a glass fiber mat and can have a thickness ranging from 5 mm to 15 mm. Aluminum sheet metal or thin aluminum foil 4 as well as a sprayed or a deposited metalized coating 5 can serve as the protective coatings. Preferably, a foil or sprayed, or deposited, protective coating 5 on a side facing the perforate support layer 2 has a thickness of less than 30 μm, while the protective coating on the side facing away from the support layer can have a thickness of from 0.05 mm to 1.2 mm.

FIG. 1 shows clearly that the support layer 2 is not perforated in all areas thereof. In particular, peripheral edge areas 6a, 6b, which are flanged, are free from perforations 9. Also, the angularly deformed zones 7, such as bent places 7a and corrugations or pleats 7b, for example, are formed to be free of perforations. Substantially perforation-free partial areas are predetermined by attachment, or mounting, zones 8.

Such a designed, or arranged, heat shield 1 has a higher stability relative to previously-known perforate heat shields and can be more easily and more reliably mounted. At the same time, increased turbulence is created in air passing by the heat shield 1 by the perforations 9 which are in those partial areas of the heat shield not relevant for the stability thereof. A thereby increased higher air convexion consequently enhances heat-insulative effectiveness of the heat shield. The perforations 9 are preferably bores with 1 mm to 7 mm diameters which take up not more than 30% of the entire surface of the support layer 2 of the heat shield.

In one tested embodiment of this heat shield free surfaces created by the bores 9 amount to 17% of a total surface of the support layer. This embodiment included a sprayed or deposited metalization protective coating 5 on the side of the insulation layer 3 facing the support layer 2. In this manner, sound energy passing through the perforations is optimally passed further to the insulation layer 3. The combination of the perforate support layer 2 with the sprayed or deposited metalization protective coating 5 improves acoustical effectiveness of the heat shield 1.

Figure 2:
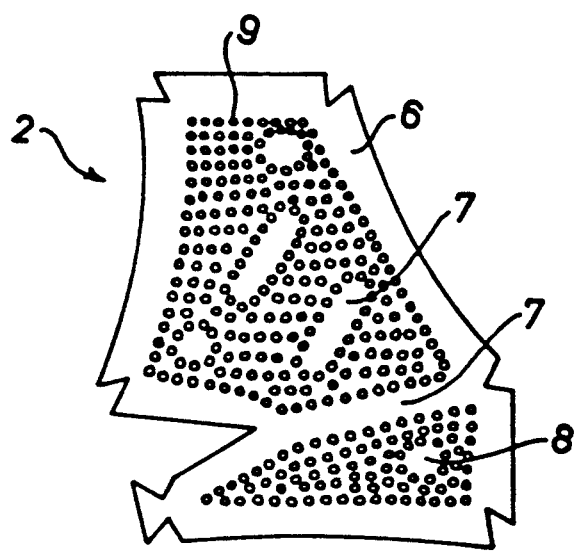
FIG. 2 is a plan view of a support layer suitable for the manufacture of a heat shield of this invention.

FIG. 2 shows a view of a support layer 2 provided with perforations 9 which is suitable for the manufacture of the heat shield of this invention. The contours of this support layer and the contours of the perforation-free partial areas 6, 7 and 8 are determined by mounting positions. It is clearly visible that the flange zones, or peripheral edge zones 6, attachment zones 8, and deformed zones 7 are exempted from perforations. As can be seen, some of the perforation-free areas 7 and 8 are non-symmetrically arranged on the surface of the support layer 2, and are surrounded by perforate areas.

In a tested manufacture of a heat shield of this invention a support layer as well as foil and insulation layers are cut along predetermined contours in a first step. In a second step, the support layer is perforated in predetermined partial areas and is pressed or stamped into a specific form. Parallel thereto, the insulation layer is provided with, or united with, the protective coatings and is pressed to have the same form as the support layer. In a third step, both building parts are laid on one another and connected, or united. In this process, the perforation free flange zone 6 proves itself to be particularly beneficial. For one thing, since the flange is formed of a perforation-free sheet-metal part, it is less complicated and more reliable and, for another thing, since it is bent-back sheet metal, the flange additionally seals a side edge of the insulation layer. This perforation free flange zone 6 makes possible not only a good mechanical closing, but also allows an additional sealing material, for example silicon, to be placed in a pocket formed by the flange to prevent absorption of moisture by an open side edge of the insulation layer.

Further embodiments of the heat shield of this invention lie in normal technical abilities of one of ordinary skill in the art. For example, instead of a sprayed or deposited metalization protective coating, fine porous foils can be used, or bores of the perforations in various areas can have various sizes in order to optimize acoustical effectiveness of the heat shield. It is understandable that the thickness and the density of the insulation layer and in particular the structure of the support layer are sized to maximize inherent stability while minimizing thickness and a weight of the entire heat shield. Also, it lies in the ability of one skilled in the art to further simplify a manufacturing process so that, for example, the various formed during a single manufacturing step.

The above described sound absorbing heat shields can be used on motor vehicles, particularly autos and motorcycles, as well as on building or industrial machines which include intolerable sound and heat sources.

In particular, the perforation-free partial areas include the flange, or peripheral edge zones, of a heat shield. In this manner, the forming of sawtooth-like edges which prevent quick mounting, are prone to break, and can damage protective foils, are avoided. For the same reasons, the perforation-free partial areas include also mounting or attachment zones. A particular benefit thereby arises that additional attached mounting elements can be avoided. Further perforation-free partial areas include deformed zones. In particular, bent places or corrugations or pleats and grooves are made to be perforation free. By a desired choice of these perforation-free partial areas, the shield receives an increased inherent stability and can therefore also be fabricated of a thin material.

In a first preferred embodiment of the heat shield is included a protective coating of a porus aluminum foil. This foil preferably has a thickness of less than 30 $\mu$m in order to reflect heat radiation and to be able to effectively further conduct sound waves to the insulation layer.

In a second preferred embodiment of the heat shield is included a sprayed or deposited metalization protective coating. Such protective coatings have a cohesive open pore structure and provide sufficient protection for the insulation layer. Heat shields provided with such protective coatings have excellent acoustical qualities.

The embodiments of the invention in which an exclusive property or privilege are claimed are as follows:

1. A contoured sound absorbing heat shield for attachment to motor vehicles between exhaust systems and floor portions thereof, said sound absorbing heat shield comprising:
   a perforate metallic support layer having perforations therethrough distributed over a substantial portion of a surface thereof;
   a sound absorbing heat insulating layer attached to said support layer, said sound absorbing heat insulating layer comprising a sheet of a first insulating material with a thin protective coating of a different material on each of opposite sides thereof, said protective coatings covering substantially the entire opposite sides, said sound absorbing heat insulating layer being attached to said perforate support layer with one of said protective coatings lying on said surface of said support layer;
   wherein said support layer includes at least one perforation-free partial area, and at least one partial area which is substantially free of perforations arranged on said surface of said support layer in a substantially non-symmetrical manner being substantially surrounded by perforate areas, said protective coating lying on both said perforation-free and perforate areas of said support layer, said at least one substanially perforation free partial area including an attachment means for attaching said support layer to structure of said motor vehicle.

2. In a heat shield as in claim 1 wherein a protective coating at least on a side of the insulating layer facing the support layer is of an aluminum foil.

3. In a heat shield as in claim 1 wherein the protective coating at least on a side facing the support layer is a sprayed metalized coating.

4. In a heat shield as in claim 1 wherein there are a plurality of perforation-free partial areas of said support layer including a flange zone thereof which is doubled back to cover edges of said sound absorbing heat insulating layer.

5. In a heat shield as in claim 1 wherein the at least one perforation-free partial area is a deformed area having an angularly bent or corrugated zone.

6. In a heat shield as in claim 2 wherein there are a plurality of perforation-free partial areas including a flange zone thereof which is doubled back to cover edges of said sound absorbing heat insulating layer.

7. In a heat shield as in claim 3 wherein there are a plurality of perforation-free partial areas including a flange zone thereof which is doubled back to cover edges of said sound absorbing heat insulating layer.

8. In a heat shield as in claim 1 wherein there are a plurality of substantially non-symmetrical, substantially surrounded, perforation-free partial areas.

9. In a heat shield as in claim 8 wherein at least one of the substantially non-symmetrical, substantially surrounded, perforation-free partial areas is a deformed area having an angularly bent or corrugated zone.

10. A combination including:
a machine; and
a sound absorbing heat shield for insulating said machine from surrounding areas, said sound absorbing heat shield comprising:
  a perforate metallic support layer having perforations therethrough over a substantial portion of a surface thereof;
  a sound absorbing heat insulating layer attached to said support layer, said sound absorbing heat insulating layer comprising a sheet of a first material with a thin protective coating of a different material on each of opposite sides thereof, said protective coatings covering substantially the entire opposite sides, said sound absorbing heat insulating layer being attached to said perforate support layer with one of said protective coatings lying on said surface of said support layer;
wherein said support layer includes at least one perforation-free partial area, and at least one partial area which is substantially free of perforations arranged on said surface of said support layer in a substantially non-symmetrical manner being substantially surrounded by perforate areas, said protective coating lying on both said perforation-free and perforate areas of said support layer, said at least one substantially perforation-free partial area including a means for attaching said support layer to said machine.

* * * * *